(12) United States Patent
Henry (10) Patent No.: US 8,878,381 B2
(45) Date of Patent: Nov. 4, 2014

(54) SYSTEM FOR CONVERSION OF WAVE ENERGY INTO ELECTRICAL ENERGY

(75) Inventor: Terry Wayne Henry, Caddo Mills, TX (US)

(73) Assignee: Global Perpetual Energy, Inc., Caddo Mills, TX (US)

( * ) Notice: Subject to any disclaimer, the term of this patent is extended or adjusted under 35 U.S.C. 154(b) by 0 days.

(21) Appl. No.: 13/487,114

(22) Filed: Jun. 1, 2012

(65) Prior Publication Data

US 2013/0140823 A1 Jun. 6, 2013

Related U.S. Application Data

(63) Continuation-in-part of application No. PCT/US2010/058995, filed on Dec. 3, 2010.

(60) Provisional application No. 61/266,961, filed on Dec. 4, 2009.

(51) Int. Cl.
| | |
|---|---|
| *F03B 13/10* | (2006.01) |
| *F03B 13/12* | (2006.01) |
| *H02P 9/04* | (2006.01) |
| *F03B 13/20* | (2006.01) |
| *F03B 17/06* | (2006.01) |
| *F03D 9/00* | (2006.01) |
| *F03B 13/26* | (2006.01) |

(52) U.S. Cl.
CPC ............... *F03B 13/20* (2013.01); *F03B 17/061* (2013.01); *F05B 2240/95* (2013.01); *F05B 2240/40* (2013.01); *Y02E 10/725* (2013.01); *F03D 9/008* (2013.01); *Y02E 10/28* (2013.01); *F03B 13/264* (2013.01); *Y02E 10/38* (2013.01); *Y05B 2240/93* (2013.01)

USPC .............................................. 290/53; 290/42

(58) Field of Classification Search
USPC ...................................... 290/42, 53
See application file for complete search history.

(56) References Cited

U.S. PATENT DOCUMENTS

| | | | | |
|---|---|---|---|---|
| 100,761 | A * | 3/1870 | Heitmann | 415/7 |
| 244,221 | A * | 7/1881 | Fountain et al. | 415/7 |
| 313,746 | A * | 3/1885 | Man | 290/43 |
| 328,447 | A * | 10/1885 | Brady | 290/43 |

(Continued)

FOREIGN PATENT DOCUMENTS

GB 2383978 A * 7/2003 ............. B63B 35/44

OTHER PUBLICATIONS

International Search Report for PCT/US2010/058995 (Terry Wayne Henry), mail date Feb. 11, 2011.

*Primary Examiner* — Pedro J Cuevas
(74) *Attorney, Agent, or Firm* — Thrive IP (57) ABSTRACT

The disclosure provides a device for converting wave motion into electricity, and methods of using the devices for generating electricity. The disclosure also provides a power generation device that includes a water blanket having a plurality of pods arranged in a grid for floating on the surface of a body of water. In one example, ball joints and hydraulic cylinders couple each of the pods to adjacent pods. Motors are coupled to the hydraulic cylinders such that a flow of hydraulic fluid created by expansion and compression of the cylinders due to movement of the pods causes rotational motion in the motor. Generators are coupled to respective motors to generate electricity from the rotational motion of the motors. Power from the ocean blanket can be supplemental with wind turbines, water paddles, water turbines, and solar cells.

14 Claims, 5 Drawing Sheets

(56) References Cited

U.S. PATENT DOCUMENTS

| | | | |
|---|---|---|---|
| 1,078,323 A * | 11/1913 | Trull | 417/332 |
| 1,113,440 A * | 10/1914 | Hughes | 416/85 |
| 1,147,658 A * | 7/1915 | Stukes | 416/85 |
| 1,797,089 A * | 3/1931 | Huffstutter | 415/7 |
| 2,097,286 A * | 10/1937 | McGee | 290/54 |
| 2,848,189 A * | 8/1958 | Caloia | 60/505 |
| 3,515,889 A * | 6/1970 | Kammerer | 290/53 |
| 3,758,788 A * | 9/1973 | Richeson | 290/42 |
| 3,961,863 A * | 6/1976 | Hooper, III | 417/334 |
| 3,986,787 A * | 10/1976 | Mouton et al. | 415/7 |
| 4,023,041 A * | 5/1977 | Chappell | 290/53 |
| 4,077,213 A * | 3/1978 | Hagen | 60/500 |
| 4,098,084 A * | 7/1978 | Cockerell | 60/497 |
| 4,105,368 A * | 8/1978 | Waters | 417/53 |
| 4,118,932 A * | 10/1978 | Sivill | 60/500 |
| 4,159,427 A * | 6/1979 | Wiedemann | 290/55 |
| 4,196,591 A * | 4/1980 | Wallace | 60/497 |
| 4,206,608 A * | 6/1980 | Bell | 60/698 |
| 4,210,821 A * | 7/1980 | Cockerell | 290/53 |
| 4,270,056 A * | 5/1981 | Wright | 290/54 |
| 4,279,124 A * | 7/1981 | Schremp | 60/505 |
| 4,301,377 A * | 11/1981 | Rydz | 290/43 |
| 4,341,074 A * | 7/1982 | French | 60/504 |
| RE31,111 E * | 12/1982 | Hagen | 60/500 |
| 4,383,797 A * | 5/1983 | Lee | 415/7 |
| 4,404,490 A * | 9/1983 | Taylor et al. | 310/339 |
| 4,446,378 A * | 5/1984 | Martinez Parra | 290/54 |
| 4,453,894 A | 6/1984 | Ferone et al. | 417/332 |
| 4,454,429 A * | 6/1984 | Buonome | 290/53 |
| 4,490,621 A | 12/1984 | Watabe et al. | 290/42 |
| 4,495,765 A * | 1/1985 | French | 60/398 |
| 4,516,033 A * | 5/1985 | Olson | 290/54 |
| 4,531,063 A * | 7/1985 | Vielmo et al. | 290/53 |
| 4,590,386 A * | 5/1986 | Wiggs | 290/54 |
| 4,598,210 A * | 7/1986 | Biscomb | 290/43 |
| 4,598,211 A * | 7/1986 | Koruthu | 290/53 |
| 4,630,440 A * | 12/1986 | Meyerand | 60/398 |
| 4,684,815 A * | 8/1987 | Gargos | 290/53 |
| 4,685,296 A * | 8/1987 | Burns | 60/497 |
| 4,686,377 A * | 8/1987 | Gargos | 290/53 |
| 4,717,831 A * | 1/1988 | Kikuchi | 290/53 |
| 4,725,195 A * | 2/1988 | Wiggs | 415/7 |
| 4,737,070 A * | 4/1988 | Horiuchi et al. | 415/7 |
| 4,742,241 A * | 5/1988 | Melvin | 290/53 |
| 4,792,290 A * | 12/1988 | Berg | 417/332 |
| 4,843,250 A * | 6/1989 | Stupakis | 290/53 |
| 4,954,052 A * | 9/1990 | Simmons | 417/331 |
| 5,051,059 A * | 9/1991 | Rademacher | 415/7 |
| 5,394,695 A * | 3/1995 | Sieber | 60/398 |
| 5,411,377 A * | 5/1995 | Houser et al. | 417/333 |
| 5,430,332 A * | 7/1995 | Dunn, Jr. | 290/54 |
| 5,499,889 A * | 3/1996 | Yim | 405/76 |
| 5,512,787 A * | 4/1996 | Dederick | 290/4 R |
| 5,582,008 A * | 12/1996 | Buonome | 60/398 |
| 5,986,349 A * | 11/1999 | Eberle | 290/53 |
| 6,100,600 A * | 8/2000 | Pflanz | 290/54 |
| 6,294,844 B1 * | 9/2001 | Lagerwey | 290/55 |
| 6,365,984 B1 * | 4/2002 | Shu | 290/53 |
| 6,476,511 B1 * | 11/2002 | Yemm et al. | 290/42 |
| 6,551,053 B1 * | 4/2003 | Schuetz | 415/3.1 |
| 6,768,217 B2 * | 7/2004 | Chalmers et al. | 290/53 |
| 7,000,395 B2 * | 2/2006 | Wai et al. | 60/698 |
| 7,042,112 B2 | 5/2006 | Wood | 290/53 |
| 7,075,189 B2 * | 7/2006 | Heronemus et al. | 290/44 |
| 7,081,690 B2 * | 7/2006 | Coman | 290/54 |
| 7,105,940 B2 * | 9/2006 | Weesner et al. | 290/44 |
| 7,215,036 B1 | 5/2007 | Gehring | 290/54 |
| 7,223,137 B1 * | 5/2007 | Sosnowski | 440/3 |
| 7,233,079 B1 * | 6/2007 | Cooper | 290/44 |
| 7,270,513 B2 * | 9/2007 | Regan et al. | 416/85 |
| 7,397,142 B1 * | 7/2008 | Cooper | 290/44 |
| 7,443,045 B2 * | 10/2008 | Yemm | 290/42 |
| 7,462,949 B2 * | 12/2008 | Coman | 290/54 |
| 7,579,704 B2 * | 8/2009 | Steenstrup et al. | 290/53 |
| 7,629,703 B2 * | 12/2009 | Storbekk | 290/53 |
| 7,632,041 B2 * | 12/2009 | Jean et al. | 405/76 |
| 7,694,513 B2 * | 4/2010 | Steenstrup et al. | 60/498 |
| 7,726,911 B1 * | 6/2010 | Dempster | 405/210 |
| 7,737,572 B2 * | 6/2010 | Welch et al. | 290/53 |
| 7,808,120 B2 * | 10/2010 | Smith | 290/42 |
| 7,821,147 B2 | 10/2010 | Du Bois | 290/44 |
| 7,948,101 B2 * | 5/2011 | Burtch | 290/44 |
| 7,956,478 B2 * | 6/2011 | Steenstrup | 290/53 |
| 8,030,793 B2 * | 10/2011 | Garvey | 290/54 |
| 8,049,356 B2 * | 11/2011 | Chervin et al. | 290/53 |
| 8,096,116 B2 * | 1/2012 | Draper et al. | 60/398 |
| 8,102,068 B1 * | 1/2012 | Gutekunst | 290/53 |
| 8,120,196 B1 * | 2/2012 | Neese | 290/54 |
| 8,304,925 B2 * | 11/2012 | Yang et al. | 290/42 |
| 8,364,287 B2 * | 1/2013 | Pearson et al. | 700/11 |
| 8,484,964 B2 * | 7/2013 | Preftitsis et al. | 60/495 |
| 8,536,724 B2 * | 9/2013 | Dullaway | 290/53 |
| 8,581,432 B2 * | 11/2013 | Rohrer | 290/53 |
| 8,624,416 B2 * | 1/2014 | Wille et al. | 290/53 |
| 8,803,346 B2 * | 8/2014 | Pitre et al. | 290/42 |
| 2003/0155774 A1 * | 8/2003 | Chalmers et al. | 290/53 |
| 2003/0168864 A1 * | 9/2003 | Heronemus et al. | 290/55 |
| 2005/0198963 A1 * | 9/2005 | Wai et al. | 60/698 |
| 2006/0055175 A1 | 3/2006 | Grinblat | 290/54 |
| 2006/0119107 A1 * | 6/2006 | Coman | 290/54 |
| 2007/0029806 A1 * | 2/2007 | Coman | 290/54 |
| 2007/0102937 A1 * | 5/2007 | Resen Steenstrup et al. | 290/53 |
| 2007/0108773 A1 * | 5/2007 | Resen Steenstrup et al. | 290/53 |
| 2007/0138021 A1 * | 6/2007 | Nicholson | 205/628 |
| 2007/0145748 A1 * | 6/2007 | Pierz | 290/43 |
| 2007/0200353 A1 | 8/2007 | Ottersen | 290/53 |
| 2008/0231053 A1 * | 9/2008 | Burtch | 290/52 |
| 2010/0084870 A1 * | 4/2010 | Burcik | 290/54 |
| 2010/0116684 A1 * | 5/2010 | Sawyer | 205/628 |
| 2010/0194115 A1 * | 8/2010 | Jakubowski et al. | 290/55 |
| 2010/0237623 A1 * | 9/2010 | Brown et al. | 290/53 |
| 2010/0237625 A1 * | 9/2010 | Dempster | 290/54 |
| 2010/0244450 A1 * | 9/2010 | Tabe | 290/53 |
| 2010/0244451 A1 * | 9/2010 | Ahdoot | 290/53 |
| 2010/0258449 A1 * | 10/2010 | Fielder | 205/628 |
| 2010/0259044 A1 * | 10/2010 | Muchow | 290/43 |
| 2010/0308589 A1 * | 12/2010 | Rohrer | 290/53 |
| 2010/0308590 A1 * | 12/2010 | Rohrer | 290/53 |
| 2011/0068579 A1 * | 3/2011 | Dullaway | 290/53 |
| 2011/0304144 A1 * | 12/2011 | Dehlsen et al. | 290/53 |
| 2013/0009401 A1 * | 1/2013 | Biteryakov | 290/53 |
| 2014/0042744 A1 * | 2/2014 | Daya | 290/42 |
| 2014/0145442 A1 * | 5/2014 | Hart | 290/53 |

* cited by examiner

SYSTEM FOR CONVERSION OF WAVE ENERGY INTO ELECTRICAL ENERGY

CROSS-REFERENCE TO RELATED APPLICATIONS

This application is a continuation-in-part of International Application No. PCT/US2010/058995, filed Dec. 3, 2010, which claims the benefit of U.S. Provisional Application No. 61/266,961, filed Dec. 4, 2009, both of which are herein incorporated by reference in their entirety.

FIELD

This disclosure relates in general to power generation and, more particularly, to a power generation plant for deriving electricity from water motion.

BACKGROUND

Large portions of the world suffer from shortages in power generation. As a result, many of these countries remain underdeveloped from the rest of the world, and their citizens often must survive through harsh living conditions for much of the year, as neither heat nor cooling is available.

In the rest of the world, the vast amount of electricity is generated by oil, gas, coal or nuclear power plants. Burning oil, gas and coal results in polluted air, and all of those fuel resources are rapidly diminishing as the need for electricity has skyrocketed in developed countries. Nuclear energy requires the disposal of spent nuclear fuel, which remains dangerous for centuries.

Many clean alternatives have similar problems. Solar cells have an unlimited fuel source during daylight hours, but generate no electricity at night. Wind turbines also have a potentially unlimited power source, the wind, but will also not produce any power when the wind is light. With no practical way to store excess energy, these sources are generally supplemental to a fossil fuel powered energy system.

Therefore, a need has arisen for an energy plant that does not require fossil fuels and which produces generally uninterrupted energy.

SUMMARY

The present disclosure relates to a device for converting wave motion to electricity. In some embodiments, the device comprises a plurality of movable-interconnected buoyant pods, wherein movement of the pods in response to wave motion generates mechanical motion for use in generating electricity. In some embodiments, each of the plurality of buoyant pods is movably connected to at least one other of the plurality of buoyant pods via at least one of a plurality of coupling apparatus. In some embodiments, the device further comprises a motor operatively coupled to a generator and at least one of the plurality of coupling apparatus. In further embodiments, the coupling apparatus includes a hydraulic cylinder and an optional ball joint, wherein flow of hydraulic fluid created by expansion and compression of the cylinder due to movement of the pods in response to wave action causes rotational motion in the motor, which can drive a generator and produce electricity. In alternative embodiments, the coupling apparatus is a linear generator.

The present disclosure also provides a power generation unit comprising an integrated first system and at least one second system, each of the first and at least one second systems convert sources of renewable energy to electricity, the first system comprising a plurality of moveably interconnected buoyant pods forming a water blanket having a top side and a bottom side, wherein the water blanket generates electricity when the pods move in response to wave action; and the at least one second system is chosen from a system for converting solar energy to electricity, a system for converting wind energy to electricity, and a system for converting water energy such as ocean current energy or river flow energy into electricity. In some embodiments, each of the first and at least one second system are operatively connected to one or more generators for producing electricity. In further embodiments, the wind energy conversion system is one or more wind turbines disposed directly or indirectly on the top side of the water blanket, the solar energy conversion system is one or more solar cells disposed on the top side of the water blanket, and the water energy conversion system is one or more of at least one water turbine disposed on the bottom side of the water blanket and at least one water paddle disposed on the bottom side of the water blanket. In yet further embodiments, the at least one second system is a set of wind turbines, a set of water turbines, a set of water paddles, and a set of solar cells. In some embodiments, the power generation unit provides a near continuous source of power.

The present disclosure also provides a floating platform configured to generate electricity in response to wave movement, and one or more subsystems connected to the platform for converting one or more of wind, solar, or water energy to electricity. In some embodiments, the platform is comprised of a plurality of pods wherein each pod is movably interconnected to at least one other pod by a coupling apparatus such that movement of the pods in response to wave action causes the coupling apparatus to directly or indirectly convert wave energy into electricity. In further embodiments, the coupling apparatus is operative coupled to a generator such that movement of the pods in response to wave motion causes the coupling apparatus to convert the wave motion into mechanical motion for driving the generator. In some embodiments, the one or more subsystems is a wind turbine subsystem, a water paddle subsystem, a water turbine subsystem, or a solar cell subsystem, or combinations thereof, wherein the wind turbine subsystem comprises one or more wind turbines disposed on a top side of the platform and operatively connected to a generator, the water paddle subsystem is at least one water paddle connected to the platform and operatively connected to a generator, the water turbine subsystem is disposed on an underside of the platform and operatively connected to a generator, and the solar cell subsystem comprises at least one solar cell disposed on the top side of the platform and operatively connected to a generator. In some embodiments, the platform includes gas or liquid-fillable ballasts which enable the platform to be raised or lowered for maintenance or use.

The disclosure also provides methods for generating energy from wave motion, and optionally from additional renewable sources of energy. In some embodiments, the method involves generating a near continuous source of renewable energy. In some embodiments, the method involves deploying in the ocean a device for converting wave motion to electricity, or a floating platform which is comprised of a plurality of movably interconnected pods configured to convert wave motion to electricity, or a power generation unit comprising an integrated first system and at least one second system, each for converting sources of renewable energy to electricity. In some embodiments, deploying involves fixing the device, platform or power generation unit to the ocean floor. In some embodiments, deploying involves freely floating the device, platform or power generation in the ocean, and moving the device, platform or power generation unit as needed, for example seasonally, to ocean locations with relatively stronger current.

In some embodiments, devices and methods according to the disclosure provides significant advantages over the prior art. For example, in some embodiments, the devices generate no greenhouse gases and do not use fossil fuels, nuclear fuel, or other non-renewable fuels. In some embodiments, the cost of energy should be greatly reduced, as all power sources come to the device naturally and continuously.

DESCRIPTION OF DRAWINGS

For a more complete understanding of the present invention, reference is now made to the following descriptions taken in conjunction with accompanying drawings, in which.

DETAILED DESCRIPTION

A. Definitions

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The term "about" is meant to account for variations due to experimental error. The term "substantially" is intended to permit deviations that don't negatively impact the intended purpose. All measurements or numbers are implicitly understood to be modified by the word about, even if the measurement or number is not explicitly modified by the word about. Similarly, all descriptive terms are implicitly understood to be modified by the word substantially, even if the descriptive term is not explicitly modified by the word substantially.

As a person of ordinary skill understands, if a component is described as connected to another component, the connection may be a direct or indirect connection.

B. Description

The present disclosure generally provides devices for generating power from wave motion, devices for generating power from wave motion and one or more additional alternative energy sources, including devices that produce near continuous power from alternative energy sources, and methods for generating power, including generating near continuous power, from renewable energy sources.

An embodiment of the present invention is described in FIGS. 1-10 of the drawings, like numerals being used for like elements of the various drawings.

Figure 1:
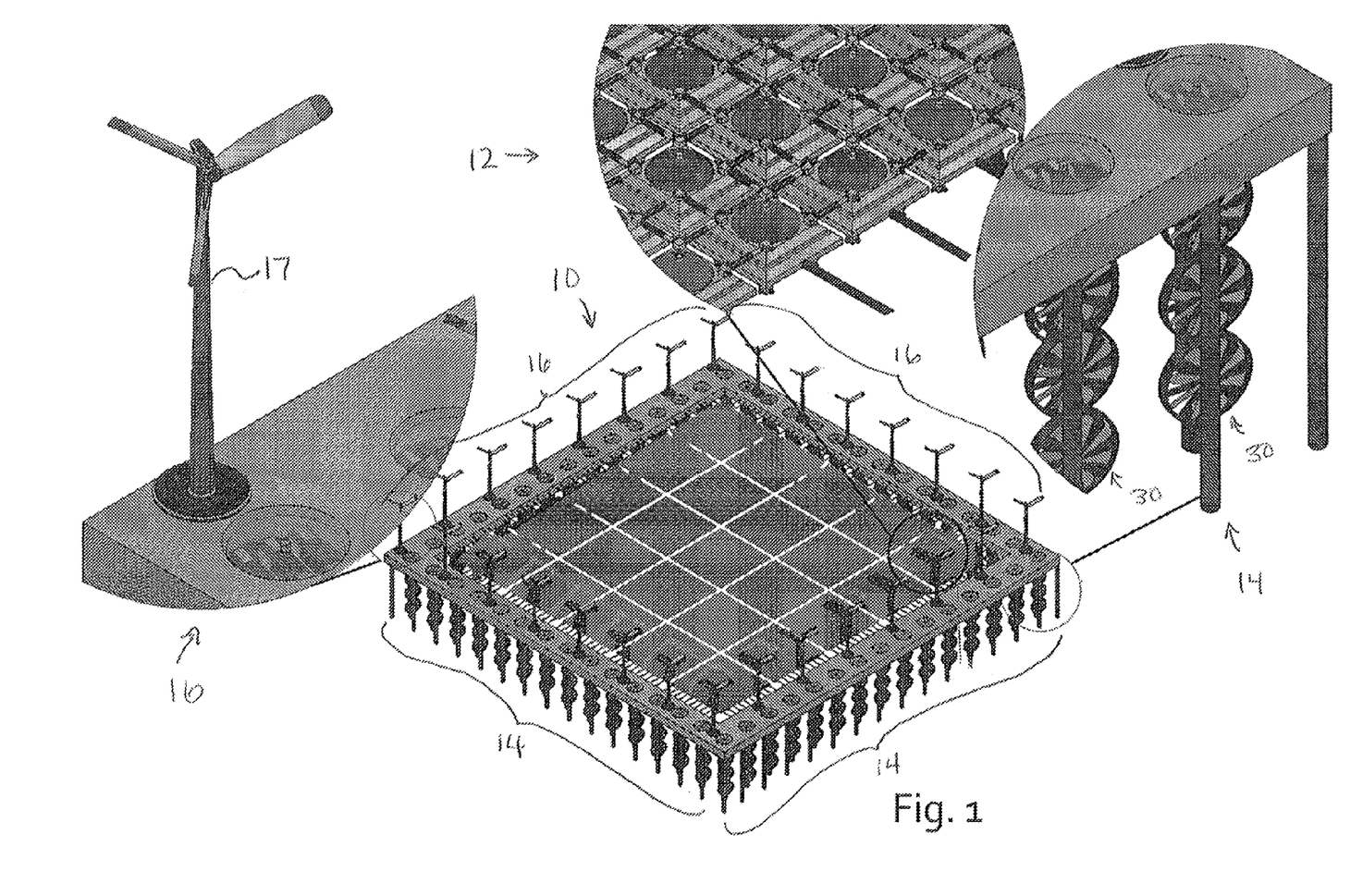
FIG. 1 is a perspective view of an embodiment of a power generation system with details of the subsystems.

FIG. 1 illustrates the Continuous Energy Plant, which uses forces in the ocean, at the surface of the ocean, and above the ocean, to generate power continuously. Four forces are exploited—the tide, ocean currents, the waves, wind above the ocean, and sunlight.

FIG. 1 illustrates the overall system 10 with detailed view of the main components. There are three main subsystems: (1) the Ocean Blanket Subsystem 12, (2) the Water Turbine Subsystem 14, and (3) the Windmill Subsystem 16. The system 10 can be built offshore using a platform that is anchored to the ground using piers, similar to technologies used by offshore rigs.

Each of the subsystems provides energy using different forces and in many cases there is only a small possibility that all the forces will be low at the same time. Power from the system 10 can be transferred to the end user using undersea power cables.

On the deck of the system 10, large wind turbines 16a, which can be of conventional design create electricity from the wind.

The Ocean Blanket Subsystem 12 comprises three separate assemblies for providing electricity. First, a grid is formed of pods 18, which are connected together by mechanical ball joints 20 which give the pods 18 freedom of movement in all directions relative to adjacent pods 18. Pods are further linked by multiple hydraulic cylinders 22 coupling the pods that expand and contract responsive to movement of the floating pods as they move relative to one another due to waves. As the cylinders expand and contract, they create a flow of hydraulic fluid through hydraulic pump/motors associated with each of the pods, causing the motor to turn. As the motor turns, it power a generator. Up to sixteen hydraulic cylinders may be connected to each pod. Operation of the hydraulic cylinders, motor and generator is described in greater detail in connection with FIGS. 2-6. Power from the generator is passed through a slip ring 23. The slip ring 23 stays in a fixed position as the system spins, keeping all electrical connections together. All of the power generated by a pod 18 will continuously pass through its slip ring 23.

Second, paddle wheels 24 beneath the pod 18 (see FIG. 2 for greater detail) on the bottom (i.e. submerged) side of each pod 18 provide a second source of electricity. As the ocean current flows, the paddle wheels 24 turn, driving another generator on the pod assembly. The paddle wheels rotate around horizontal axes to provide power; each paddle wheel 24 can also rotate around a vertical axis, responsive to a rudder, to keep its horizontal rotational axis perpendicular to the flow of the ocean current, to maximize the force of the current pushing the paddle wheel 24.

Third, the stationary domes 26 on the top of the pods 18 are covered with photovoltaic (solar) cells 28. The solar cells 28 convert sunlight into electricity.

Power is passed to the underwater cables through the slip ring 23 for each pad 18, which allows the pad to move freely without stressing the electrical connection. In the preferred embodiment, both hydraulics and electric energy pass through the slip ring 23.

The pods of the Ocean Blanket subsystem 12 are described in greater detail in connection with FIGS. 2-6. Energy generated by hydraulics is described in connection with FIGS. 2-3. Each side of a pod 18 is connected to a side of an adjacent pod (except for certain sides on the periphery of the grid) by a ball joint 20 having a male joint portion 20a and a female joint portion 20b. The ball joints are disposed in the center of all sides, with each pod having two male ball joint sections and two female ball joint sections. This allows all of the pods to be mechanically connected together, but allowing the pods 18 to have full movement. Each pod 18 can move independently up and down, and back and forth, and in and out.

Figure 2:
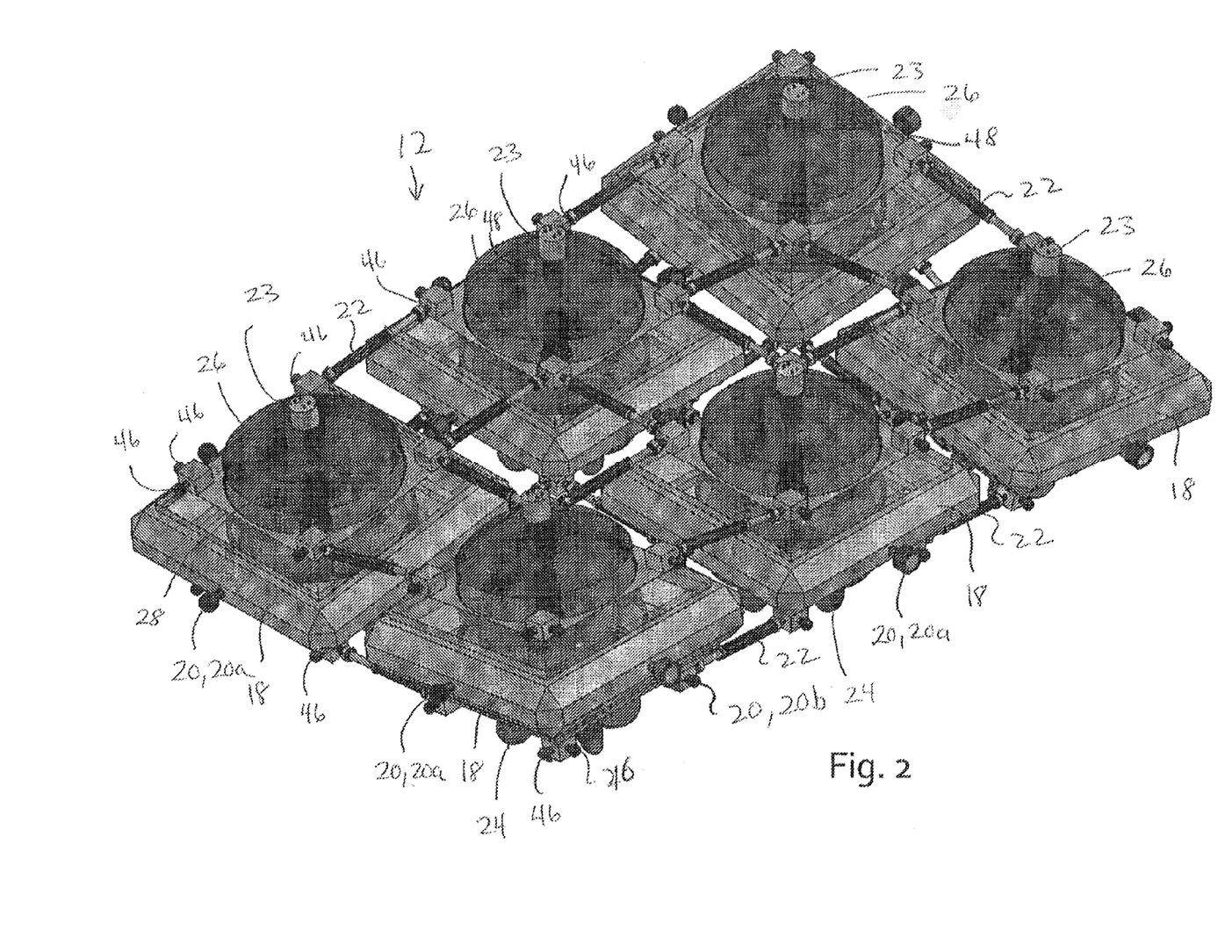
FIG. 2 is a perspective view of a portion of an embodiment of ocean blanket subsystem.
Figures 3, 4, 5, 6:
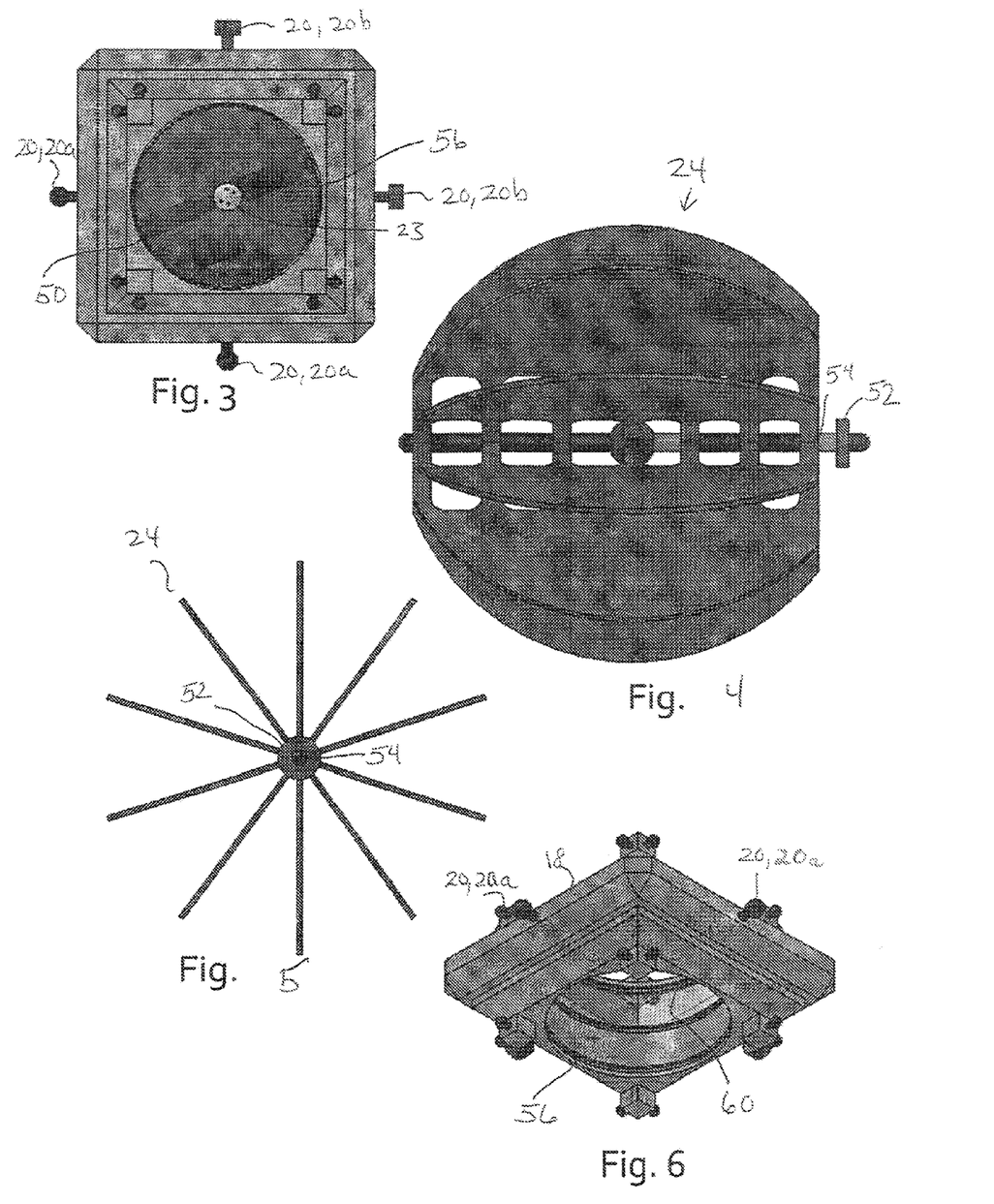
FIG. 3 is a top view of an embodiment of a pod used in the ocean blanket system of FIG. 2.
FIG. 4 is a front view of an embodiment of a paddle wheel used in the pod of FIG. 3.
FIG. 5 is a side view of the paddle wheel of FIG. 4.
FIG. 6 is a bottom perspective view of recesses used for rotation of the mechanisms within the pod of FIG. 3.

The hydraulic cylinder 22 also connect the pods 18 together. Each side of a pod 18 has up to four cylinders 22 that are connected to the pod 18 with ball joints 42. Every hydraulic cylinder 22 completes a ball joint 46 (in the illustrated embodiment, the cylinders 22 have female ball joint portions at each end and the pods 18 have male ball joint portions) at each end. The pods 18 can have up to 16 hydraulic cylinders that will move simultaneously. The movements of the pods 18 create hydraulic forces in the cylinders 22, which power hydraulic motors 48. The hydraulic motors power respective generators 50, which create electricity.

Referring to FIGS. 4 and 5, the paddle wheel 24 on the bottom side of the pod has a shaft that has sealed roller bearing at each end. As the ocean current flows it turns the paddle wheel 24. There is a pulley 52 close to the end of the shaft 54. This pulley is connected to a pulley on the generator 56, as the paddle wheel 24 rotates it creates energy through the second generator 56.

The paddle wheel 24 rotates around a horizontal axis to generate electricity. If the ocean current changes direction, the paddle has to be able to also change direction; for this reason the paddle wheel has to be able to spin around the vertical axis. This is accomplished by creating a recess 58 (see FIG. 6) in the pod that the shaft bearing can move freely around the vertical axis. Simultaneously the generator base (the base that supports both the motor, hydraulic pump, tank, and two generators) has to be able to spin around the vertical axis. This is accomplished by a series of sealed bearings, and or cam followers underneath the generator base. These bearings ride on the recess 60 in the pod 18 that allows the generator base to spin freely around the vertical axis. The paddle wheel can rotate 360 degrees around the vertical and horizontal axis simultaneously. A rudder (not shown) is used to keep each paddle assembly rotating about a horizontal axis perpendicular to the ocean current flow.

The Ocean Blanket 12 generates an amount of power which is based on:
1. Speed of the current.
2. Size of the waves.
3. Frequency of the waves.
4. Size and weight of the pod assemblies.
5. Sun availability.

Accordingly, the Ocean Blanket 12 provides electricity in almost any climate and during any time of day. The Ocean Blanket 12 can also be coupled to the platform using cylinders such that the rising and falling tide creates hydraulic flow.

This system will work continuously. As long as the ocean (or other body of water such as river or large lake) has movement this system will continuously generate electricity. The ocean alone has more than enough force to supply electricity for the entire earth.

Figure 7:
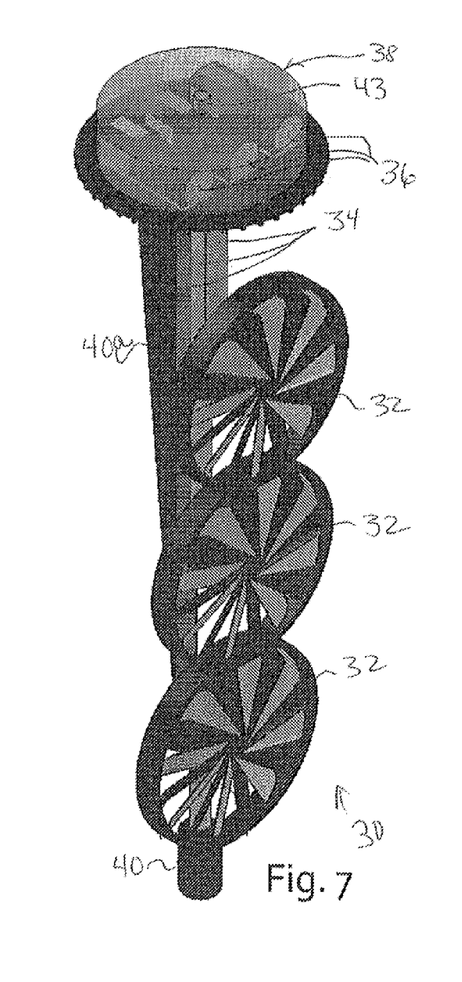
FIG. 7 is a perspective view of an embodiment of a water turbine assembly.
Figure 8:
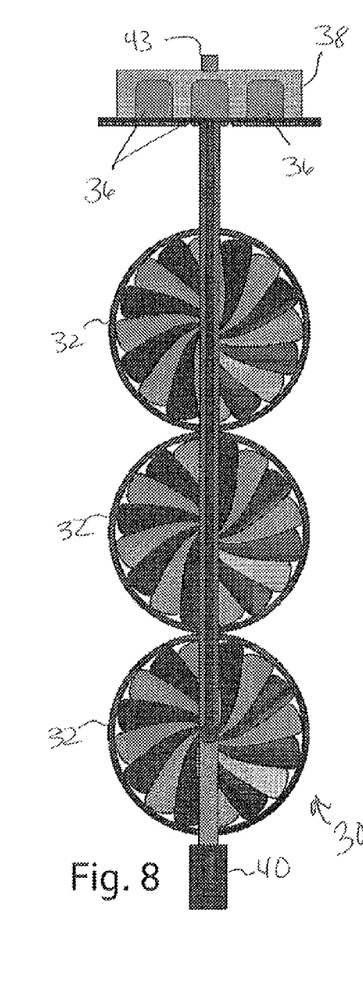
FIG. 8 is a rear view of the water turbine assembly of FIG. 7.
Figure 9:
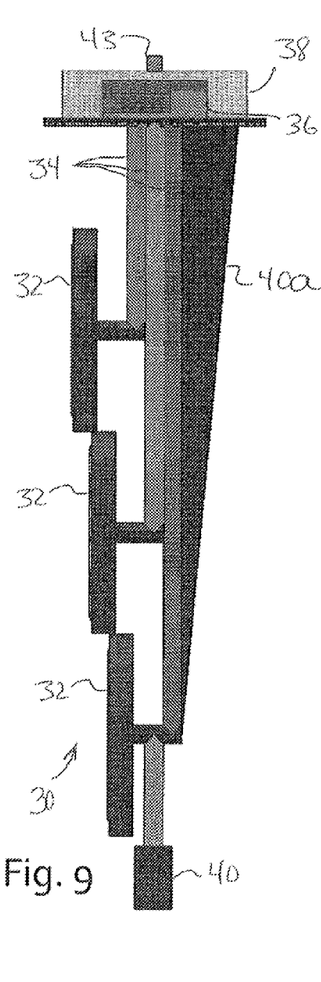
FIG. 9 is a side view of a water turbine assembly of FIG. 7.

The Water Turbine Subsystem 14 is shown in greater detail in FIGS. 7-9. The Water Turbine Subsystem 14 includes a plurality of turbines 30 around the periphery of the Ocean Blanket 12. Each turbine assembly 30 has multiple turbines 32, each preferably having an individual vertical shaft 34 coupled to a respective generator 36 enclosed in a generator base 38. As water flows through the turbines, each turbine 32 spins its own shaft 34, which in turn causes the respective generator 36 to produce electricity. The shafts 34 extend between the associated turbine 32 and generator base 38.

Because of the size of the water turbines, a rotatable anchor point 40 is connected to telescoping piers 44 (see FIG. 10), in order to stabilize the bottom of the turbine assemblies 30, allowing each water turbine 30 to spin freely around its vertical axis as the current changes direction. The orientation of the water turbine assembly 30 relative to its vertical axis is also controlled by a rudder (not shown) connected to each turbine assembly 30, such that the turbines 32 spin in a plane perpendicular to the ocean currents.

Figure 10:
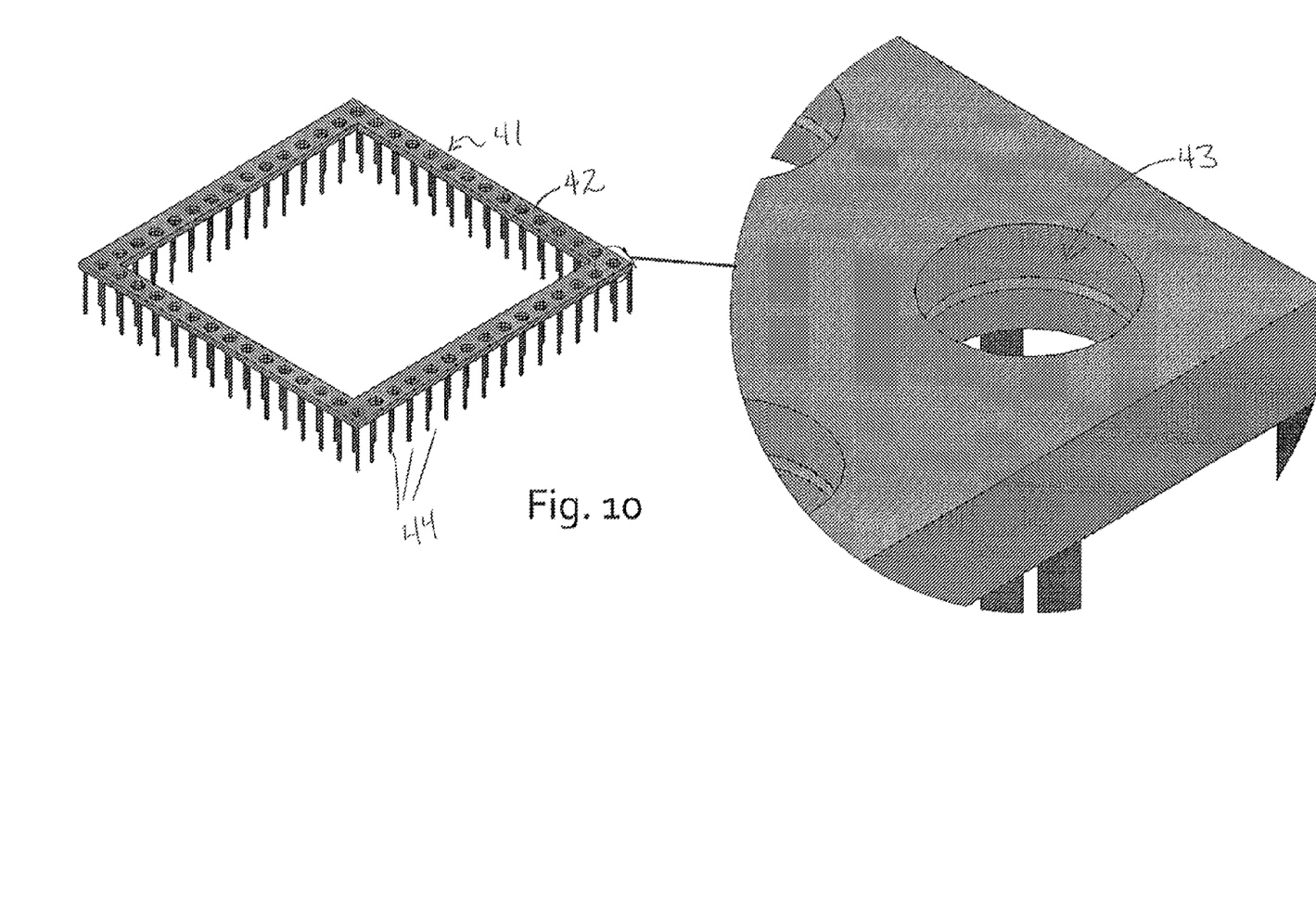
FIG. 10 is perspective view of an embodiment of a platform with a detailed view of a hole for mounting water turbine assemblies.

In the preferred embodiment shown in FIG. 10, a pier system 41 with a platform 42 that supports a vertical shaft is used. This pier system 41 would have sealed bearings in mounting holes 43 that would allow a support shaft 40a to spin. On the top of the platform, the water turbines assemblies 30 each have sealed roller bearings, and/or cam-followers that permit the whole assembly 30 to rotate. Telescoping piers 44 anchor the platform 42, but allow it to rise and fall with the tides.

In operation, the Water Turbine subsystem 14 uses the force of the ocean current, and/or the flow of water (such as in a river) to rotate the water turbines 32. The larger the diameter of the turbines 32, the greater the force that will be created to drive the generators 36. This subsystem is designed to allow for large diameter water turbines. As with wind turbines 17 and paddles 24 a rudder determines the direction of the water current, and or the flow of water (not shown on drawing), such that the force of the current against the turbines 32 is optimized.

Each water turbine 32 rotates around a horizontal axis. A shaft connected to either a right angle gearbox and/or to a right angle joint will rotate around a vertical axis as the water turbine 32 rotates around its horizontal axis. As the vertical shaft rotates, it will drive its associated generator to produce electricity.

In the preferred embodiment, each water turbine 32 has its own shaft 34, so that each water turbine assembly 30 will have multiple shafts, with each shaft extending from the water turbine 32 to the respective generator 36. The generators 36 then send power out through a slip ring 43. The slip rings 43 allow equipment to rotate while being able to maintain power connections, such as electricity (power, and controls), pneumatics, hydraulics, water etc. . . . The purpose of this slip ring 43 is to allow the power (electricity) generated from the generators out to the end user, yet allowing the water turbines assemblies to spin freely.

The slip ring 43 stays in a fixed position while the generator base 38, and the water turbines 32, spin around the vertical axis. As the system spins, the slip ring 43 will keep all electrical connections together, all of the power generated by all of the generators 36 will continuously pass through the slip ring 43. From this point, the electricity created by this system can be transferred to the end user utilizing underwater sea cables, and or overhead cables.

Preferably, guarding is provided to protect the water turbine assemblies from the creatures in the water, boats, submarines, and general debris flowing through the water.

The power generated by the overall system 10 will be determined by location, because there are many factors that can change even on a daily basis such as:
1. Speed of the current.
2. Size of the waves.
3. Frequency of the waves.
4. Size and weight of the pod assemblies.
5. Sun availability.
6. Wind speed.
7. The diameter of the water turbines.
8. The different types of water turbines.
9. The type of blade assemblies.
10. The number of blade assemblies.
11. Surface area of the blades.
12. The number of water turbines on each assembly.

This system 10 could be used to generate power for not only cities, but also countries around the world. Conventional power plants utilize gas, coal, or nuclear. This system would utilize our earth's largest and most plentiful natural resources, which have an unlimited supply of power. Just as importantly, the system 10 will work continuously. As long as the oceans have movement, the sun continues to shine, and the wind continues to blow, this system will continuously generate electricity. The ocean alone has more than enough force to supply electricity for the entire earth.

The present invention provides significant advantages over the prior art:
1. No greenhouse gases
2. Does not require external fuel source such as:
   a. Coal
   b. Gas
   c. Nuclear
   d. other non-renewable fuels
3. Environmentally friendly
4. Reduces the cost of electricity
5. Will ultimately reduce the cost of fuel around the world. It is the basic rule of supply and demand. Since the demand will significantly drop down, then price will follow.
6. Saves our earth's resources that are not renewable.
7. Helps omit global warming.

Although the Detailed Description has been directed to certain exemplary embodiments, various modifications of these embodiments, as well as alternative embodiments, will be suggested to those skilled in the art.

For example, although the specification describes the pods as being movably interconnected by hydraulic cylinders, a person of skill with the benefit of this disclosure can appreciate that other coupling apparatus can be used. For example, the pods can be movably interconnected by linear generators (in addition to or alternative to the hydraulic cylinders) or any other coupling link that can convert the motion of the pods in response to wave action directly or indirectly into electricity.

As another example, the power generation unit could be supported by ballasts which may be reversibly filled (e.g. filled and drained and refilled) with fluid (gas or liquid) to cause the unit to be further submerged in water or alternatively be raised above the water for easier access to the underside, for example for maintenance.

As yet another example, the disclosure describes a platform that is fixed to the ocean bed. However, in an alternative embodiment the platform can be freely floating and moved periodically to insure the platform is located where the current is sufficiently strong or of a desirable strength, for example, it may be desirable to move the platform seasonally. A person of skill could, for example, use or adapt technologies used with respect to water-based oil rigs to secure power generation units according to the present disclosure and/or alternatively a person of skill could use technology used with respect to flotation of and movement of water-based oil rigs to the power generation units according to the present disclosure.

Further non-limiting examples of embodiments include:

1. A power generation device, comprising:
   a plurality of pods arranged in a grid for floating on the surface of a body of water;
   hydraulic cylinders coupling each of the pods to adjacent pods;
   a motor coupled to the hydraulic cylinders, such that a flow of hydraulic fluid created by expansion and compression of the cylinders due to movement of the pods causes rotational motion in the motor; and,
   generators coupled to respective motors to generate electricity from the rotational motion of the motors.

2. The power generation device of paragraph 1 wherein said pods further include a paddle wheel for contact with the body of water, such that currents in the body of water rotate the paddle wheel.

3. The power generation device of paragraph 2 wherein the paddle wheel is mechanically coupled to a second generator for generating electricity from rotational movement of the paddle wheel.

4. The power generation device of paragraph 1 wherein the pods are attached to a platform.

5. The power generation device of paragraph 1, further comprising wind turbines disposed on the platform for generating electricity from wind movement.

6. The power generation device of paragraph 1 further comprising water turbines assemblies coupled to the platform and extending into the body of water, wherein each water turbine assembly comprises:
   a. a plurality of turbines, each coupled to a respective shaft;
   b. a plurality of generators, each coupled to one of the shafts.

7. The power generation device of paragraph 6 wherein the generators are housed in a generator base coupled to a shaft support that rotates freely within the platform about a vertical axis.

8. The power generation device of claim 1 wherein solar cells are disposed on the pods.

9. The power generation device of paragraph 1, further comprising a platform disposed on the pods, a water paddle attached to each pod, wind turbines disposed on the platform, water turbine assemblies disposed on an underside of the platform, and solar cells disposed on a top surface of the platform.

10. The power generation device of paragraph 1, wherein each pod is attached to 16 hydraulic cylinders.

11. The power generation device of paragraph 1, further comprising ball joints coupling each of the pods to adjacent pods.

12. A device for converting wave motion into electrical energy, the device comprising: a plurality buoyant pods; and, a plurality of coupling apparatus, wherein each of the plurality of buoyant pods is moveably connected to at least one other of the plurality of buoyant pods via at least one of the plurality of coupling apparatus, wherein each of the plurality of coupling apparatus is configured to generate mechanical motion for driving motors which drive generators to produce electricity, wherein each of the buoyant pods are of sufficient size to support a wind turbine.

13. A device according to paragraph 12, wherein the pods are independently buoyant.

14. A device according to paragraph 12, wherein the device further comprises a mechanism such as a fluid-fillable ballast that results in the pods being buoyant.

15. A device according to paragraph 12, wherein the each of the plurality of buoyant pods is further movably interconnected to at least one other of the plurality of buoyant pods via a ball joint.

16. A device according to paragraph 12, wherein the buoyant pods are interconnected to form a grid of a size and strength suitable for supporting at least one of a windmill subsystem and water turbine subsystem.

17. A device according to paragraph 12, wherein the pods are configured to be able to receive a solar cell for converting solar energy to electricity.

18. A device according to paragraph 12, wherein each of the pods is connected to up to sixteen coupling apparatus.

19. A device according to paragraph 18, wherein the coupling apparatus is a hydraulic cylinder and the device further comprises one or more hydraulic motors operatively coupled to generators for producing electricity, wherein the hydraulic motors are driven by the hydraulic cylinders when they expand and compress with pod movement in response to wave action.

20. A power generation unit, comprising: an integrated first system and at least one second system, each of the first and at least one second systems are configured to convert a source of renewable energy to electricity, the first system comprising a plurality of movably interconnected buoyant pods forming a water blanket having a top side and a bottom side, wherein the water blanket generates electricity when the pods move in response to wave action, and the at least one second system is chosen from a system for converting solar energy to electricity, a system for converting wind energy to electricity, and a system for converting water energy such as ocean current energy or river flow energy into electricity.

21. A power generation unit according to paragraph 20, wherein each of the plurality of pods is connected to at least one other of the plurality of pods by at least one coupling apparatus that converts wave motion into electricity.

22. A power generation unit according to paragraph 21, wherein the unit further comprises one or more generators for producing electricity, and one or more hydraulic motors, and the plurality of coupling apparatus is a plurality of hydraulic cylinders that converts wave motion into mechanical motion and that are operatively connected to the one or more hydraulic motors which are in turn operatively connected to the one or more generators.

23. A power generation unit according to paragraph 20, wherein the at least one system for converting solar energy to electricity comprises one or more solar cells disposed on the top side of the water blanket, the at least one system for converting wind energy to electricity comprises one or more windmills disposed on the top side of the water blanket, and the at least one system for converting water energy to electricity is chosen from a system comprising a water paddle connected to the water blanket, a system comprising water turbines disposed on the bottom side of the water blanket, or both.

24. A power generation unit according to paragraph 23 comprising each of the solar energy system, wind energy system, water paddle system, and water turbine system.

25. A device for generating power from one or more sources of renewable energy, comprising a floating platform configured to generate electricity in response to wave movement, and one or more subsystems connected to the platform for converting one or more of wind, solar, or water energy to electricity.

26. A device according to paragraph 25, wherein the device provides a near continuous source of power.

27. A device according to paragraph 25, wherein the floating platform is comprised of a plurality of movably interconnected pods, wherein movement of the pods in response to wave action generates electricity.

28. A device according to paragraph 25, wherein the device further comprises a plurality of coupling apparatus and each of the plurality of pods is connected to at least one other of the plurality of pods by at least one of the plurality of coupling apparatus, wherein the coupling apparatus converts pod movement directly or indirectly into electricity.

29. A device according to paragraph 25, wherein the plurality of coupling apparatus is a plurality of hydraulic cylinders and the device further comprises one or more hydraulic motors operatively connected to one or more generators for producing electricity, wherein pod movement causes the plurality of hydraulic cylinders to compress and expand producing rotational motion in the one or more hydraulic motors.

30. A method for generating electricity from a renewable source of energy, the method comprising deploying a device for converting wave motion into electricity in the ocean, wherein the device comprises: a plurality of pods which are movably interconnected in a manner that results in movement of the pods in response to wave motion being converted to electricity; and one or more subsystems connected to the pods for converting one or more of wind, solar, or water energy to electricity.

31. A method according to paragraph 30, wherein the plurality of pods form a platform and deploying the device further comprises fixedly attaching the platform to the ocean floor.

32. A method according to paragraph 30, wherein the device is freely floating in the ocean, and the method further comprises periodically moving the device to a location with a desired ocean current strength.

33. A method according to paragraph 30, wherein the device further comprises a plurality of coupling apparatus, and each of the plurality of pods is connected to at least one other of the plurality of pods by a coupling apparatus, wherein movement of the pods induces the coupling apparatus to convert wave motion into electricity.

34. A method according to paragraph 33, wherein the plurality of coupling apparatus is a plurality of hydraulic cylinders and the device further comprises one or more hydraulic motors operatively connected to one or more generators for producing electricity, wherein movement of the pods causes the hydraulic cylinders to expand and compress resulting in rotational motion in the hydraulic motors.

The invention encompasses any such modifications or alternative embodiments, and any additional modifications and alternative embodiments that fall within the scope of the claims.

What is claimed is:

1. A power generation device, comprising:
a plurality of pods arranged in a grid for floating on the surface of a body of water;
hydraulic cylinders coupling each of the pods to adjacent pods;
a motor coupled to the hydraulic cylinders, such that a flow of hydraulic fluid created by expansion and compression of the cylinders due to movement of the pods causes rotational motion in the motor; a generator coupled to the motor to generate electricity from the rotational motion of the motor; a platform disposed on the pods; a water paddle attached to each pod; wind turbines disposed on the platform; water turbine assemblies disposed on an underside of the platform; and solar cells disposed on a top surface of the platform.

2. A power generation unit, comprising: an integrated first system and at least one second system, each of the first and at least one second systems are configured to convert a source of renewable energy to electricity, the first system comprising a plurality of movably interconnected buoyant pods forming a water blanket having a top side and a bottom side, wherein the water blanket generates electricity in response to wave action, and the at least one second system is chosen from a system for converting solar energy to electricity, a system for converting wind energy to electricity, and a system for converting water energy such as ocean current energy or river flow energy into electricity, wherein the at least one system for converting solar energy to electricity comprises one or more solar cells disposed on the top side of the water blanket, the at least one system for converting wind energy to electricity comprises one or more windmills disposed on the top side of the water blanket, and the at least one system for converting water energy to electricity is chosen from a system comprising a water paddle connected to the water blanket, a system comprising water turbines disposed on the bottom side of the water blanket, or both, and further wherein the power generation unit comprises each of the solar energy system, wind energy system, water paddle system, and water turbine system.

3. A power generation device for use on a body of water, comprising:
   a. a water blanket comprising a plurality of buoyant pods which are movably interconnected to generate electricity in response to wave action in the body of water, wherein each of the buoyant pods has a top side and a bottom side and the water blanket has a perimeter;
   b. a system for converting solar energy to electricity;
   c. a system for converting water energy such as ocean current energy or river flow energy into electricity; and,
   d. optionally, a platform located along at least a portion of the perimeter of the water blanket;
   wherein the solar energy system is disposed on the top side of one or more buoyant pods, and further wherein the water energy system is one of a first water energy system, which when in use extends into the body of water from one or more buoyant pods, a second water energy system, which when in use extends into the body of water from the platform, if present, or both.

4. A power generation device according to claim 3, wherein the power generation device comprises a platform, the platform is movably coupled to the water blanket such that electricity may be generated in response to wave action in the body of water, and the water energy system comprises the first water energy system and the second water energy system.

5. A power generation device according to claim 4, further comprising a system for converting wind energy to electricity, wherein the platform is adapted to support the wind energy system.

6. A power generation device according to claim 4, wherein the solar energy system comprises solar cells disposed on the top side of one or more buoyant pods, the first wave energy system comprises at least one paddle wheel extending into the body of water from the buoyant pod, and the second wave energy system comprises one or more water turbine assemblies extending into the body of water from the platform.

7. A power generation device according to claim 6, wherein the power generation device comprises the platform and a system for converting wind energy to electricity, and wherein the wind energy system comprises one or more wind turbines disposed on the platform.

8. A power generation device according to claim 6, wherein the paddle wheel is attached to the water blanket such that it can both rotate around a first axis to generate electricity and around a second axis in response to changes in direction of an ocean current.

9. A power generation device according to claim 7, wherein each water turbine assembly comprises one or more water turbines configured to rotate around a first axis to generate electricity and around a second axis in response to changes in direction of an ocean current.

10. A power generation device according to claim 4, wherein the power generation device comprises a platform, the solar energy system comprises solar cells disposed on the top side of one or more buoyant pods, the wave energy system is the first wave energy system and the second wave energy system, and the first wave energy system comprises at least one paddle wheel extending into the body of water from the buoyant pod, and the second wave energy system comprises one or more water turbine assemblies extending into the body of water from the platform.

11. A method of generating electricity comprising deploying a power generation device according to claim 6 in a body of water.

12. A power generation device, comprising:
   a water blanket having a perimeter and comprising a plurality of pods arranged in a grid for floating on the surface of a body of water; hydraulic cylinders coupling each of the pods to adjacent pods; a motor coupled to the hydraulic cylinders, such that a flow of hydraulic fluid created by expansion and compression of the cylinders due to movement of the pods causes rotational motion in the motor; and, a generator coupled to the motor to generate electricity from the rotational motion of the motor;
   a water paddle attached to each pod;
   solar cells disposed on a top surface of one or more pods;
   optionally, a platform disposed along at least a portion of the perimeter of the water blanket; and,
   water turbine assemblies attached to and extending below the platform, if present.

13. A power generation device according to claim 12, further comprising one or more wind turbines supported by the platform.

14. A power generation device according to claim 12, wherein the power generation device comprises the platform and further comprises one or more wind turbines supported by the platform.

* * * * *